United States Patent [19]

Biber

[11] 4,447,139

[45] May 8, 1984

[54] MEANS FOR SECURING AN OBSERVATION INSTRUMENT TO A SUPPORTING STAND

[75] Inventor: Klaus Biber, Aalen, Fed. Rep. of Germany

[73] Assignee: Carl-Zeiss-Stiftung, Heidenheim/Brenz, Oberkochen, Fed. Rep. of Germany

[21] Appl. No.: 327,189

[22] Filed: Dec. 3, 1981

[30] Foreign Application Priority Data

Dec. 24, 1980 [DE] Fed. Rep. of Germany ... 8034520[U]

[51] Int. Cl.³ ...................... G02B 21/24; F16C 11/06
[52] U.S. Cl. .................................... 350/522; 350/516; 403/90
[58] Field of Search ............... 350/522, 521, 514, 515, 350/516, 523, 527, 528, 567; 403/90, 124, 125, 122, 136, 138, 148, 144, 142, 141; 248/483, 482, 481

[56] References Cited

U.S. PATENT DOCUMENTS

| 1,757,305 | 5/1930 | Graham | 403/137 |
| 2,009,401 | 7/1935 | Hufferd et al. | 403/138 |
| 2,256,763 | 9/1941 | Reed | 403/90 |
| 3,401,999 | 9/1968 | Kephart et al. | 350/530 |
| 3,409,317 | 11/1968 | Richards | 403/90 |
| 3,691,788 | 9/1972 | Mazziotti | 403/122 |

FOREIGN PATENT DOCUMENTS 15545 of 1881 Fed. Rep. of Germany ...... 350/522

Primary Examiner—Jon W. Henry
Attorney, Agent, or Firm—Hopgood, Calimafde, Kalil, Blaustein & Judlowe

[57] ABSTRACT

The invention contemplates a universal-action joint for adjustable mounting of an observation instrument upon a support, such as a conventional floor stand. The joint is of the ball and socket variety but incorporates two separate means for frictionally loading the parts against relative displacement. The first of these loadings is resilient and at a minimum level, designed to lightly retain an adjusted positioning; the second loading is selectively applied for much greater frictional engagement, to the point of effectively locking the parts against dislodgment from adjusted position.

6 Claims, 2 Drawing Figures

MEANS FOR SECURING AN OBSERVATION INSTRUMENT TO A SUPPORTING STAND

BACKGROUND OF THE INVENTION

The present invention relates to a device for fastening an optical observation instrument, particularly an operation microscope, to a supporting stand.

Operation microscopes have illustrative use in microsurgery. In order that the operator can have both his hands free at all times for his surgical work, such microscopes are fastened to a supporting stand, and the stand must be so devised that the operation microscope can be brought into a specific position and held there.

The most frequently used type of stand is a portable floor stand, establishing a vertical column. In one known embodiment, such a stand is equipped with a vertically adjustable horizontal arm which is swingable by 360°. By means of counterweight balancing within the vertical column, the horizontal arm remains securely at any desired height. Foot-actuated bolts, with brake blocks in the base part of the stand, permit rapid and dependable locking, at a given floor position. The operation microscope itself is attached to the horizontal arm by an articulation member and couplings, so that it can be brought into any desired position. In such position, its optical axis can be swung through a large angular region by rotation about a mechanical axis in a vertical plane.

In addition to floor stands, stands with wall or ceiling attachment are also know. They can be used only in a fixed or stationary context but have the advantage that they take up little space. They are generally equipped with a swivel arm which makes it possible to bring the operation microscope into any desired position in space, within a certain range.

The known stands described above all have the disadvantage that, with the operation microscope in a given operating position in space, the optical axis of the microscope is adjustable only in one plane. Only very expensive and costly stands, for instance for neurosurgery and ENT, are free of this limitation. In the Fisch and Yasargil stands, the operation microscope can be displayed in three degrees of freedom of translation and three degrees of freedom of rotation, with counterweight balancing in each case. However, such stands are too expensive for normal practice.

BRIEF STATEMENT OF THE INVENTION

The object of the present invention is to create a device of simple construction, and therefore low cost, which makes it possible (a) to easily adjust an observation apparatus to a selected stand-supported working position in space, and within a relatively large solid angle, and (b) to lock the same in any such position.

The invention achieves this object by using a two-piece bearing bushing in surrounding engagement with a spherical part, and one of the bearing-bushing parts is provided with first means for establishing a minimum rotational moment for initial retention of an adjusted position, and with second means for selectively elevating the minimum, thereby effectively locking the adjusted position.

In a preferred embodiment, a pressure plate is arranged behind one bearing bushing, and a loading spring acts with constant force against said plate, to establish a first or minimum threshold of resistance to angular displacement. By means of an adjustable set screw, an additional force can be applied, this force being adjustable, to the point of establishing complete locking of the adjusted position.

It is possible to arrange the spherical part outside the observation instrument, with a firm detachable connection thereto. In another preferred embodiment, a portion of the housing of the observation instrument is contoured to provide the spherical part. This approach enables the center of gravity of the observation instrument to practically coincide with the center of the spherical part, so that the observation instrument remains stationary in every position while also being readily displaceable.

In a further embodiment, the spherical part has a bore for accommodation of a flexible light guide by which an observed object may be illuminated. The bore is preferably characterized by a conical flare, at an angle corresponding to the range of displacement.

The described apparatus is combined, in particularly advantageous embodiments, with known stands and in particular with portable stands, with stands for wall or ceiling attachment, and with stands which have a table base or a floor-clamping device. Combination with a vertically adjustable horizontal arm or with a swivel arm is particularly suitable.

DETAILED DESCRIPTION

Figure 1:
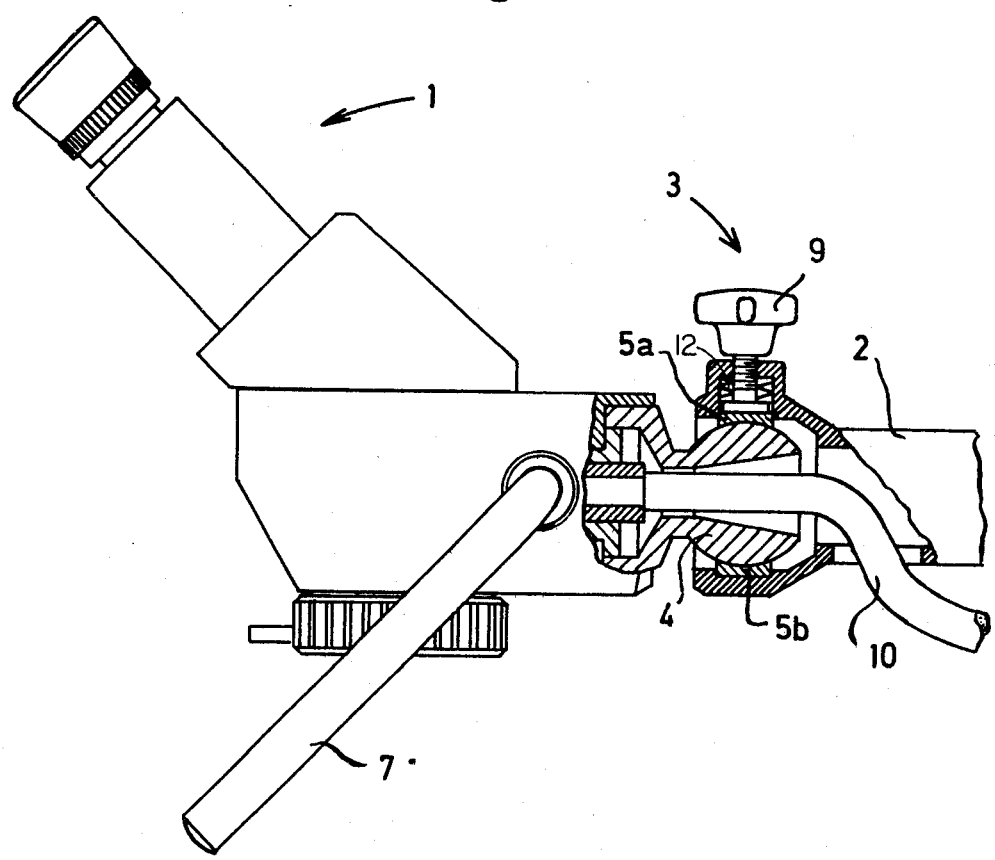
Figure 2:
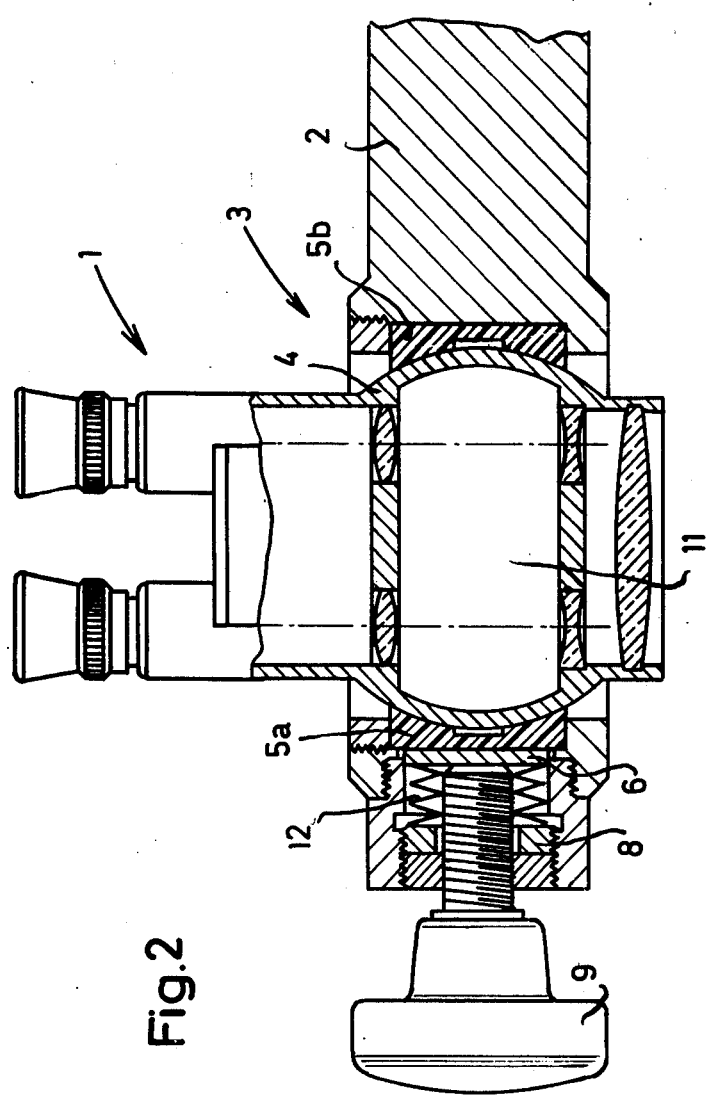

The invention will be described in detail in conjunction with FIGS. 1 and 2, in which:

FIG. 1 is a fragmentary view in elevation, partly broken away and in section, to show a first embodiment of a joint for adjustably connecting an observation instrument to its supporting stand; and FIG. 2 is a similar view to show another embodiment, in which a part of the joint is part of the housing of an observation instrument.

In FIG. 1, the numeral 1 designates an observation instrument, in this case an operation microscope. It is attached by an adjustable-joint device 3 to a supporting stand 2 of which only the outermost part, such as the end of a horizontal swing arm, is visible in the figure. The device 3 consists of a spherical part or ball 4 which is firmly attached to the observation instrument by a detachable connection. Ball 4 is mounted for rotation in all directions in a ball mounting which consists of two parts 5a and 5b. This mounting is described in further detail below in connection with FIG. 2, which shows the device on a larger scale. FIG. 1 also shows a light guide 10 which conducts light for illumination of the object to be observed. The light guide passes through the joint 3, via a bore in ball 4, and this bore is preferably conical to an extent corresponding to the solid angle within which the observation instrument is displaceable. A handle 7 serves for easy alignment of the microscope; it may be of various shapes and can be locked in different positions.

FIG. 2 shows the precise construction of another embodiment of the adjustable-joint device, which in this case surrounds the body 11 of a microscope having lenses for binocular ray-path viewing. The optical system may be a variable-focus system or it may incorporate other means of magnification change. A pressure plate 6 is disposed alongside the ball mount 5a, and plate 6 is under constant loading of a cup spring 12, the force of spring 12 being adjusted by screw-threaded plate 8. A minimum of threshold value is thus established for the rotational moment needed to change the direction of observation of the operation microscope. In the embodiment of FIG. 2, this minimum value can be very small since the center of gravity of the operation microscope practically coincides with the center of rotation. It will be understood that the indicated minimum rotational moment serves primarily to prevent unintended displacement of the operation microscope. In the embodiment of FIG. 1, the minimum rotational moment should be set considerably higher, since there is a large distance between the center of gravity and the center of rotation; as a result, larger forces are necessary in order to displace the microscope.

In order to set a higher threshold moment of rotation, up to complete immobilization of the observation instrument, a set screw 9 is provided, for selective action directly on the pressure plate 6.

The bearing bushings 5a and 5b may also be separate features of a single-piece part which is sufficiently compliant by reason of its configuration or of its material to fulfill the same purpose of a two-part bearing bushing. And it will be further understood that forces acting on the pressure plate may also be produced electromagnetically, pneumatically or hydraulically.

What is claimed is:

1. In combination, a microscope having a housing, a support, and means including an adjustably securable ball and socket joint connecting said microscope to said support; said housing including a circumferentially continuous convex spherical surface which spans both sides of a great-circle plane, whereby said convex surface is the ball component of the joint; a unipartite or bipartite bearing bushing mounted to said support and having a concave spherical surface in circumferential contact with said convex surface; first means continuously reacting between said support and said bushing for loading said bushing in engagement with said convex surface, to a first level requiring a minimum rotational moment for angular displacement of the microscope with respect to the support; and second means selectively operable for application of additional loading to said bushing, to a level wherein said rotational moment is greater than said minimum.

2. In combination, a microscope, a support, and means including an adjustably securable ball-and-socket joint connecting said microscope to said support; said microscope having a housing with a ball-defining element fixedly related thereto, said ball-defining element including a circumferentially continuous convex spherical surface which spans both sides of a great-circle plane; a unipartite or bipartite bearing bushing mounted to said support and having a concave spherical surface in circumferential contact with said convex surface; first means including a preloaded spring and a pressure plate carried by said support and continuously reacting between said support and said bushing for loading said bushing in engagement with said convex surface, to a first level requiring a minimum rotational moment for angular displacement of the microscope with respect to the support; and second means selectively operable for application of additional loading to said bushing, to a level wherein said rotational moment is greater than said minimum, said second means including an adjustable set screw carried by said support and actuable into direct load-augmenting relation with said plate.

3. In combination, a microscope having a housing which spans and surrounds the general center of gravity of the microscope, a support, and means including a ball-and-socket joint connecting the microscope to the support; said housing including a circumferentially continuous convex spherical surface which spans both sides of a great-circle plane wherein the great-circle plane is at or near said center of gravity, and means including a unipartite or bipartite bearing bushing mounted to said support and having a concave spherical surface in radially loaded circumferential contact with said convex surface, the level of such loading being of such extent as to retain an angular adjustment of the microscope housing with respect to the support with a minimum rotational moment needed to effect angular displacement for such adjustment.

4. In combination, a microscope having a housing, a support, and means including an adjustably securable ball-and-socket joint connecting said microscope to said support; said housing including a circumferentially continuous convex spherical surface which spans both sides of a great-circle plane and which encloses the center of gravity of the microscope and is the ball component of the joint; a unipartite or bipartite bearing bushing mounted to said support and having a concave spherical surface in circumferential contact with said convex surface; and selectively operable means continuously reacting between said support and said bushing for loading said bushing in engagement with said convex surface, to a level requiring a rotational moment for angular displacement of the microscope with respect to the support.

5. The combination of any one of claims 1, 3 or 4 in which a pressure plate is carried by said support in contact with said bushing, and in which loading of said bushing is via a preloaded spring, and an adjustable set screw carried by said support and actuable into direct load-augmenting relation with said plate.

6. The combination of any one of claims 1, 2 or 4, said selectively operable means being operable to effectively lock an adjusted position of said microscope with respect to said support.

* * * * *